United States Patent [19]
Hegar et al.

[11] 3,860,620

[45] Jan. 14, 1975

[54] BASIC ANTHRAQUINONE DYESTUFFS

[75] Inventors: Gert Hegar, Schoenenbuch; Visvanathan Ramanathan, Basel, both of Switzerland

[73] Assignee: Ciba-Geigy AG, Basil, Switzerland

[22] Filed: July 15, 1971

[21] Appl. No.: 163,086

Related U.S. Application Data
[62] Division of Ser. No. 717,011, March 28, 1968, Pat. No. 3,627,751.

[30] Foreign Application Priority Data
Apr. 4, 1967    Switzerland.......................... 4743/67

[52] U.S. Cl............................. 260/378, 8/39, 8/40, 260/380

[51] Int. Cl. ........ C09b 1/28, C09b 1/32, C01b 1/50

[58] Field of Search............................ 260/380, 378

[56] References Cited
UNITED STATES PATENTS
3,627,751   12/1971   Hegar et al. ........................ 260/205

*Primary Examiner*—Robert Gerstl
*Attorney, Agent, or Firm*—Joseph G. Kolodny; Edw. McC. Roberts; Prabodh I. Almaula

[57] ABSTRACT

The invention relates to basic dyestuffs that are free from acidic groups imparting solubility in water which contain at least one etherified hydroxylamino residue which is linked through the nitrogen atom to a carbon atom of the dyestuff molecule, the corresponding quaternated dyestuffs and double salts thereof.

4 Claims, No Drawings

BASIC ANTHRAQUINONE DYESTUFFS

This a division of application Ser. No. 717,011, filed Mar. 28, 1968 now U.S. Pat. No. 3,627,751.

The present invention provides new dyestuffs that are free from acidic groups imparting solubility in water, particularly sulphonic acid and carboxylic acid groups, and contain at least one etherified hydroxylamino residue which is linked through the nitrogen atom with a carbon atom of the dyestuff molecule and the corresponding quaternated dyestuffs. It is primarily concerned with dyestuffs of the formula

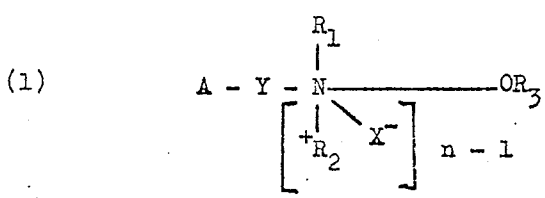

in which A represents the residue of a dyestuff which is free from sulphonic acid and carboxylic acid groups, Y represents a linear or branched aliphatic carbon chain having up to 4 carbon atoms, $R_1$ and $R_2$ each represents hydrogen or an alkyl, aralkyl or cycloalkyl residue, $R_3$ an alkyl, aralkyl or cycloalkyl residue, X represents an anion and $n = 1$ or 2, and in which N, $R_1$ and Y or N, $R_1$ and $R_2$ or N, $R_1$ and $OR_3$ may form members of a heterocycle.

The new dyestuffs may be prepared according to this invention by amidation or condensation, coupling or quaternation.

In the manufacture by amidation or condensation a reactive dyestuff derivative is reacted with an etherified, if desired quaternated, hydroxylamine or with an N-alkyl derivative thereof which contains a reactive atom or a reactive group. Thus, for example, a compound of the formula A-Y-Z, in which A and Y have the above meanings and Z represents a reactive atom or a reactive group, e.g. a halogen atom or an ester grouping, may be reacted with an etherified hydroxylamine of the formula

in which $R_1$, $R_2$ and $R_3$ have the above meanings. Alternatively, a compound of the formula

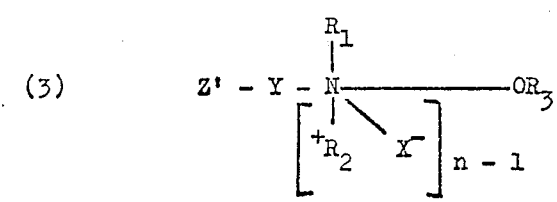

in which $R_1$, $R_2$ and $R_3$, X, Y and $n$ have the above meanings and Z' stands for a reactive atom or a reactive group, e.g. a halogen atom, a sulphato group, an amino group, a carboxylic acid chloride or sulphonic acid chloride group, may be reacted with a compound of the formula A'—Z'', in which A' is a dyestuff residue and Z'' a reactive atom or a reactive group that is capable of reacting with Z'.

in the manufacture by coupling, which applies to azo dyestuffs, a diazo compound may be coupled with a coupling component, of which at least one must contain the abovementioned etherified hydroxylamino residue, preferably the residue of the formula

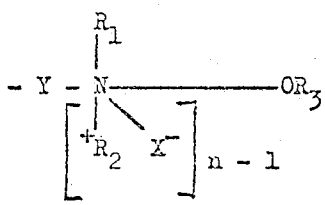

in which $R_1$, $R_2$ and $R_3$, X, Y and $n$ have the meanings defined above.

In the manufacture by quaternation the corresponding dyestuffs containing an unquaternated etherified hydroxylamine residue are treated with quaternating reagents, e.g. dyestuffs of the formula (1), where $n = 1$ and A, Y, $R_1$ and $R_3$ have the above meanings, may be reacted with compounds of the formula $R_2X$, in which X has the meaning defined above and $R_2$ represents an alkyl, aralkyl or cycloalkyl residue.

The dyestuff radical A may be that of a dyestuff of any one of the following series: nitroso, nitro, styryl, stilbene, di- or triarylmethane, methine, polymethine, sulphur, anthraquinone, quinoimine, azine, oxazine, thiazine, perinone, naphthoquinone, indigo, quinophthalone, pyrazolone, xanthene, acridine, quinoline, cyanine, phthalocyanine, azomethine or especially the mono-, dis- or polyazo series. As suitable anthraquinone dyestuff radicals there may be mentioned e.g. those of the formula

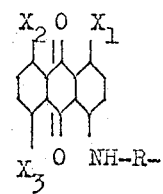

in which R represents a lower alkyl or an aryl radical e.g. a methylene or phenylene group, $X_1$ stands for an $-NH_2$ or $-OH$ group and $X_2$ and $X_3$ each represents hydrogen, or an $-NH_2$, $-OH$ or $-NO_2$ group, or those anthroquinones which contain further substituents in ortho-position to one of the groups $X_1$ or $-NH-R-$, e.g. halogen, alkyl or alkoxy.

In the anthraquinone dyestuff series the following may be mentioned as being suitable for the reaction with the etherified hydroxylamine; in these formulae Z has the meaning defined above and stands more especially for a chlorine atom or for a sulphato, arylsulphonyloxy or alkylsulphonyloxy group.

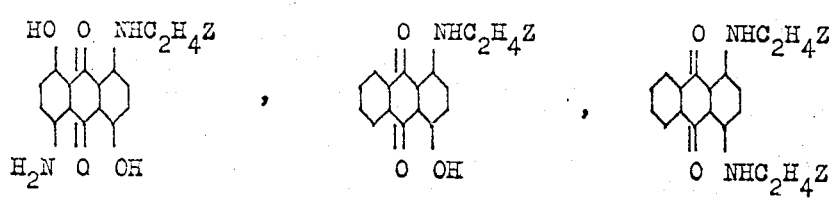

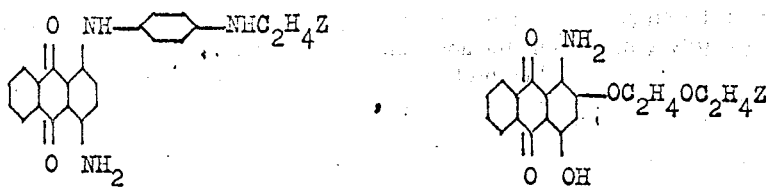

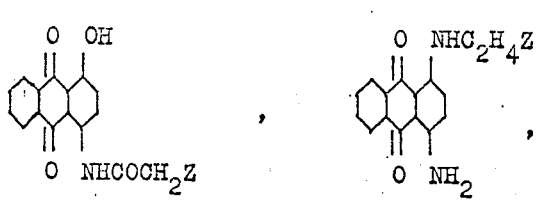

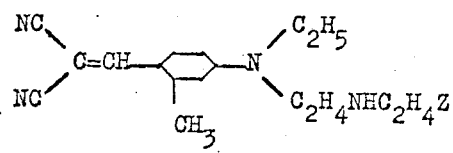

In the nitro dyestuff series the following starting materials may be mentioned (in which Z has the above meaning):

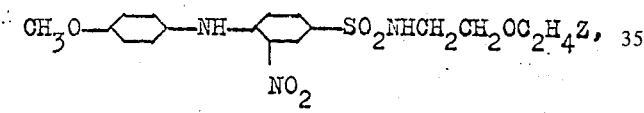

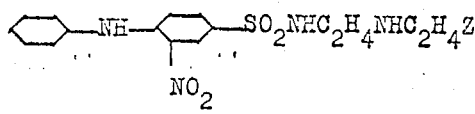

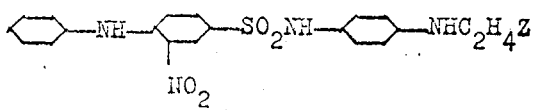

As examples of styryl dyestuffs the following may be mentioned in which Z also has the above meaning:

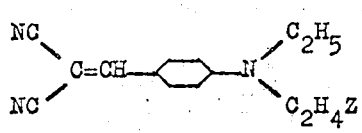

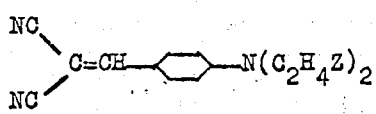

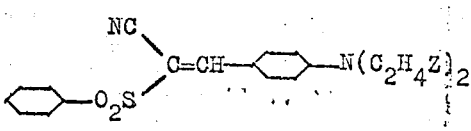

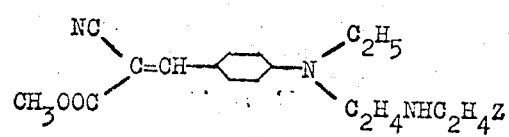

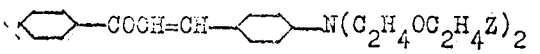

Suitable azo dyestuffs are those which have been prepared by coupling diazotized amines, preferably of the aromatic or heterocyclic series, with any desired coupling components, of which at least one component must contain a reactive atom or a reactive group Z or Z" as defined above. A list of suitable diazo and coupling components is given further on in connection with the description of the manufacture by coupling.

According to process (a) of the present invention starting dyestuffs are reacted with quaternated or unquaternated etherified hydroxylamines of the formula (2) or (3). As such compounds the following for instance may be mentioned:

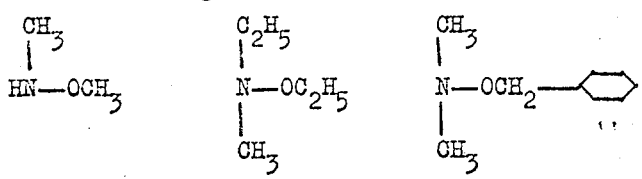

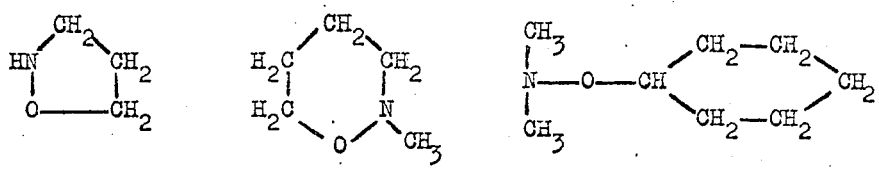

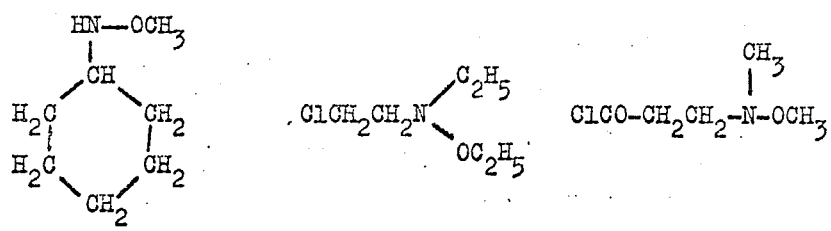

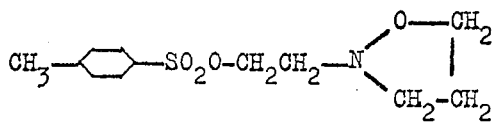

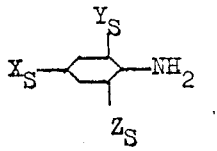

The reaction of the dyestuff containing e.g. a halogeno- or sulphatoalkyl group, with the etherified hydroxylamine is carried out in a neutral solvent e.g. in chlorobenzene, an alcohol or aqueous alcohol mixture or in dimethylformamide, or in the absence of solvents, advantageously at an elevated temperature in an excess of the hydroxylamine and, if desired, in the presence of a catalyst, e.g. sodium iodide.

According to process (b) of the present invention the reaction with the etherified hydroxylamines may be carried out with dyestuff intermediates instead od with the dyestuffs, and from the resulting reaction products the final products are obtained by coupling or condensation. This variant is particularly suitable for the manufacture of azo dyestuffs. For this purpose a diazotized amine is coupled with a coupling component; either the diazo component or the coupling component must contain the etherified hydroxylamine residue.

As examples of diazo components aromatic compounds may be particularly mentioned e.g. those of the napthalene or especially of the benzene series. The latter correspond e.g. to the formula in which $X_S$ represents a hydrogen or halogen atom, or a cyano, carbalkoxy, alkanesulphonyl sulphonamide, phenylazo or nitro group, $Y_S$ represents a hydrogen or halogen atom or a nitro, alkyl, alkoxy, trifluoromethyl, carbalkoxy or cyano group, $Z_S$ represents a hydrogen or halogen atom, and at least one of the residues $X_S$ or $Y_S$ must stand for a halogen atom or a nitro, carbalkoxy, cyano, alkylsulphonyl, sulphonamide or phenylazo group.

As examples of suitable diazo components of the benzene series the following may be mentioned: aniline, 1-amino-3- or -4-chlorobenzene, -1-amino-4-bromobenzene, 1-amino-2-, -3- or -4-methylbenzene, 1-amino-2-, -3- or -4-nitrobenzene, 1-amino-4-cyanobenzene, 1-aminobenzene-3- or -4-methylsulphone, 1-amino-2-chlorobenzene-4-methylsulphone, 1-amino-2,5-dicyanobenzene, 1-amino-4-carbethoxybenzene, 1-amino-2,4- or -2,5-dichlorobenzene, 1-amino-2,4-dibromobenzene, 1-amino-2-methyl-4- or -6-chlorobenzene, 1-amino-2-trifluoromethyl-4-chlorobenzene, 1-amino-2-cyano-4-chlorobenzene, 1-amino-2-cyano-4-nitrobenzene, 1-amino-2-carbomethoxy-4-chlorobenzene, 1-amino-2-methanesulphonyl-4-chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-chloro-4-carbethoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5- or -2,6-dichlorobenzene-4-sulphonic acid dimethylamide, 1-amino-2-chlorobenzene-4-sulphonic acid dimethylamide, 1-amino-2,6-dibromobenzene-4-sulphonamide, 1-amino-2,4-dinitro-6-chloro- or -6-bromobenzene, 1-amino-2,4-dicyano-6-chlorobenzene, 1-amino-2,4,6-trichloro- or -tribromobenzene, 1-aminobenzene-3 - or -4-sulphonamide, 1-aminobenzene-3- or -4-sulphonic acid-N-methylamide or -diethylamide, 4-aminoazobenzene, 4-amino-2'-chloro-azobenzene, 4-amino-2',4°-dichloro-azobenzene, 4-amino-3'-chloro-azobenzene, 4-amino-2'-nitro-azobenzene, 1-amino-4-nitrobenzene-2-methylsulphone, 1-aminobenzene-4-carboxylic acid-β-methoxyethyl ester, 4-amino-3nitroazobenzene, 4-amino-3'-nitro-azobenzene, 4-amino-2-methyl-azobenzene, 4-amino-4'-methoxyazobenzene, 4-amino-3-nitro-2'-chloroazobenzene, 4-amino-3-nitro-4'-chloroazobenzene, 4-amino-3-nitro-2', 4'-dichloroazobenzene, 4-amino-3-nitro-4'-methoxyazobenzene, 4-aminodiphenyl and 2- or 4-aminodiphenyl ether.

Further suitable diazo components are any desired diazotisable heterocyclic amines that are free from acidic substituents imparting solubility in water, and especially amines containing a 5-membered heterocycle with 2 or 3 hetero atoms, above all one nitrogen atom and one or two sulphur, oxygen or nitrogen atoms as hetero atoms.

From the series of heterocyclic diazo components the following may be mentioned as examples: 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-nitrobenzthiazole, 2-amino-6-carbethoxybenzthiazole, 2-amino-6-methylsulphonylbenzthiazole, 2-amino-1,3,4-thiadiazole, 2-amino-1,3,5-thiadiazole, 2-amino-4-phenyl- or 4-methyl-1,3,5-thiadiazole and 2-amino-5-phenyl-1,3,4-thiadiazole.

When the above-mentioned diazo components are to be used, the etherified hydroxylamino group must be present in the coupling component, unless it is to be subsequently introduced by condensation. As examples of such coupling components the following compounds may be mentioned; in the formulae shown Q represents a quaternated or unquaternated etherified hydroxylamino group linked through the nitrogen atom or, when this group is to be subsequently introduced by condensation according to the process (a) of the invention, it represents a reactive atom or a reactive group, e.g. a halogen atom, a sulphato group or an arylsulphonyloxy or alkylsulphonyloxy group:

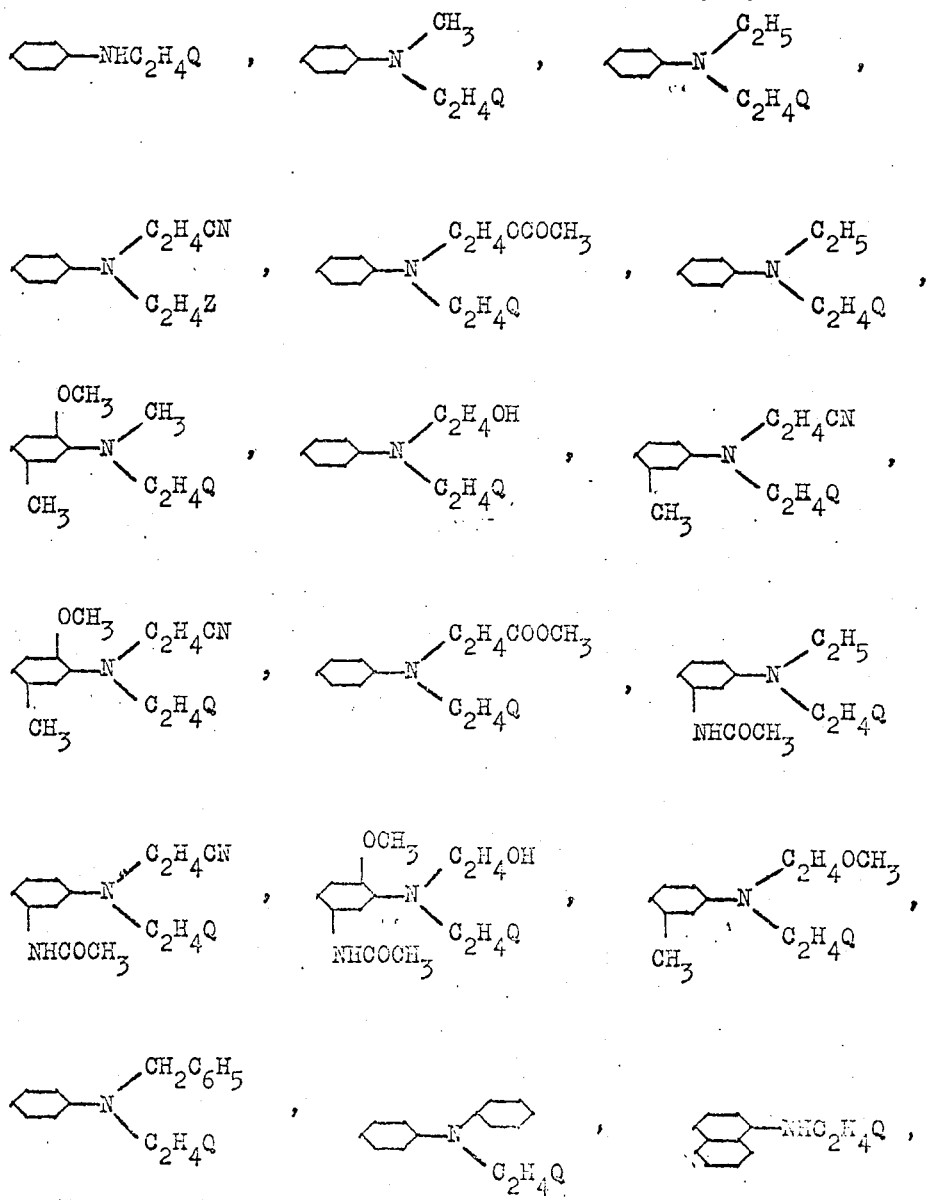

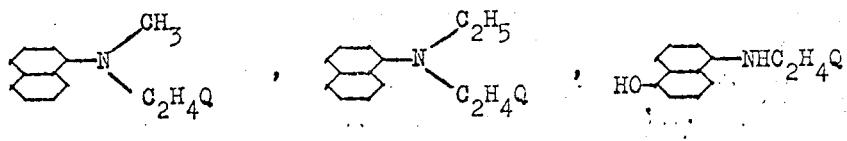

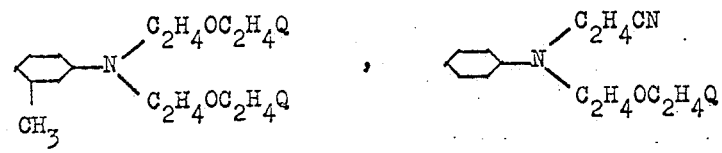

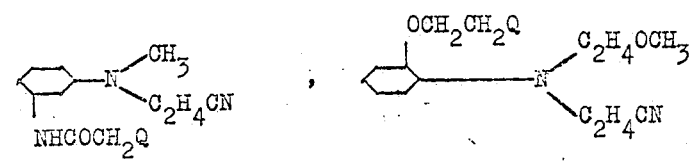

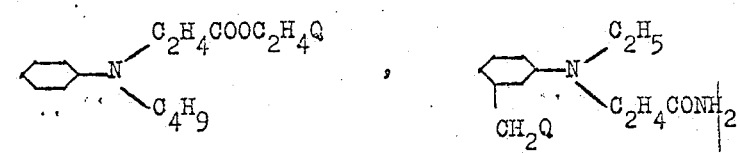

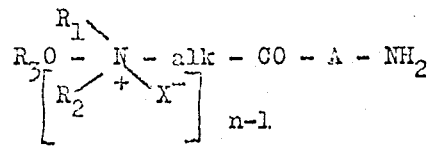

When a coupling component is used that does not contain an etherified hydroxylamino group, this group must be present in the diazo component unless it is subsequently introduced by condensation. As such diazo components there may specially mentioned aminobenzenes of the formula $$R_3O - \underset{\underset{R_2}{|}}{\overset{\overset{R_1}{|}}{N}} - alk - CO - A - NH_2 \quad \left[ \; \; \; \; \; \; \; \; \; +X^- \right]_{n-1}$$

in which X, n and R$_1$, R$_2$ and R$_3$ have the same meanings as in formula (1), alk represents an alkylene bridge and A a benzene nucleus which may carry substituents, e.g. halogen atoms, nitro or lower alkyl or alkoxy groups. As examples of quaternated derivatives the following compounds may be mentioned: 4-amino-α-(N-chloro-N,N-dimethyl-N-methoxyamino)-acetophenone, 4-amino-α-(N-chloro-N,N-diethyl-N-ethoxyamino)-acetophenone, 4-amino-α-(N-chloro-N-methoxypiperidino)-acetophenone, 4-amino-3-methyl-α-(N-chloro-N,N-dimethyl-N-methoxyamino)-acetophenone, 4-amino-3-methoxy-α-(N-chloro-N,N-dimethyl-N-methoxyamino)-acetophenone, 4-amino-3-chloro-α-(N-chloro-N,N-dimethyl-N-methoxyamino)-acetophenone, 4-amino-3-bromo-α-(N-chloro-N,N-dimethyl-N-methoxyamino)-acetophenone, 4-amino-2-chloro-α-(N-chloro-N,N-dimethyl-N-methoxyamino)-acetophenone, 4-amino-2,5-dimethyl-α-(N-chloro-N,N-dimethyl-N-methoxyamino)-acetophenone, 4-amino-β-(N-chloro-N,N-dimethyl-N-methoxyamino)-propiophenone, 4-amino-β-(N-chloro-N-methoxy-piperidino)-propiophenone, 3-amino-α-(N-chloro-N,N-dimethyl-N-methoxyamino)-acetophenone and 4-amino-α-(N-bromo-N-ethyl-N-benzyl-N-methoxyamino)-acetophenone.

These diazo components are accessible by known methods, for example by reacting acetylaminobenzene with chloroacetyl or chloropropionyl chloride, reacting the resulting chloro-acylacetylaminobenzene with a tertiary, etherified hydroxylamine and elimination of the acetyl group. The corresponding tertiary, etherified hydroxylamino compounds which are obtainable by reacting the said chloroacylacetylaminobenzenes with a secondary, etherified hydroxylamine may also be used.

Further suitable are diazo components that contain an etherified hydroxylamino group, including those of the general formula

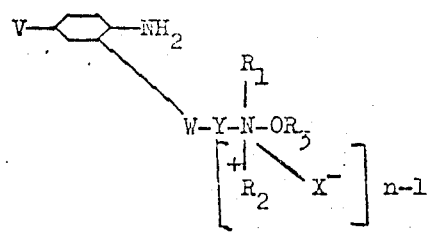

in which V represents a nitro, alkylsulphonyl or unsubstituted or substituted sulphonamide group, W represents a bivalent residue e.g. an —O—or —S— bridge or a direct bond, and $R_1$, $R_2$ and $R_3$, X, Y and $n$ have the same meanings as in formula (1), and in which the benzene residue may contain further substituents. As such diazo components there may be mentioned, for example, the compounds of the formulae

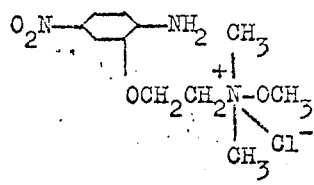

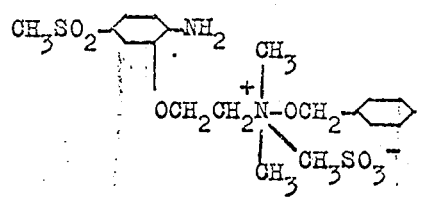

or

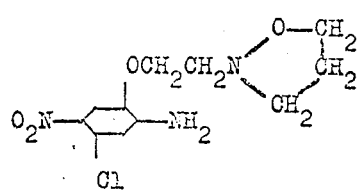

Also suitable are diazo components that contain an etherified hydroxylamino group, including those of the general formula

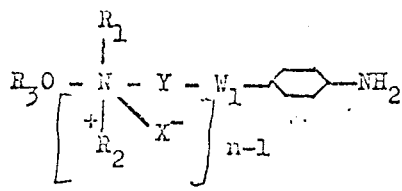

in which $W_1$ represents a bivalent organic residue e.g. an —$SO_2$—, —$SO_2NR_4$—, —$CONR_4$— or —COO— bridge and $R_1$, $R_2$ and $R_3$, X, Y and n have the same meanings as in formula (1), and $R_4$ represents a hydrogen atom or an alkyl, cycloalkyl, aralkyl or aryl group. As examples of such diazo components there may be mentioned:

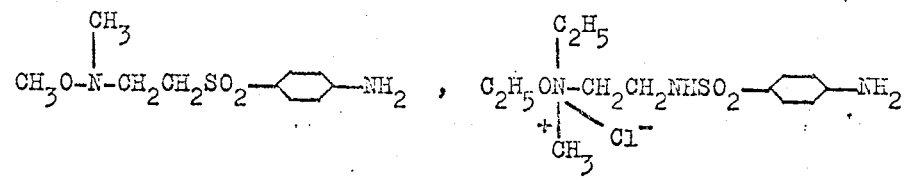

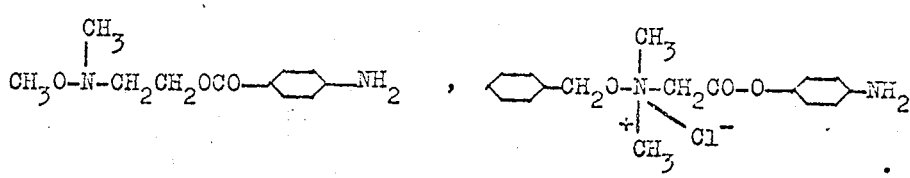

the coupling component used may be of any desired kind and may belong e.g. to the benzene or naphthalene series or to the series of the heterocyclic coupling components. From among the coupling components of the benzene series there may be mentioned, apart from the phenols, for example para-cresol, especially the aminobenzenes, for example aniline, 3-methylaniline, 2-methoxy-5-methylaniline, 3-acetylamino-1aminobenzene, N-methylaniline, N-β-hydroxyethylaniline, N-β-methoxyethylaniline, N-β-cyanoethylaniline, N-β-chloroethylaniline, dimethylaniline, diethylaniline, N-methyl-N-benzylaniline, N-n-butyl-N-β-chloroethylaniline, N-methyl-N-β-cyanoethylaniline, N-methyl-N-β-hydroxyethylaniline, N-ethyl-N-β-chloroethylaniline, N-methyl-N-β-acetoxyethylaniline, N-ethyl-N-β-methoxyethylaniline, N-β-cyanoethyl-N-βchloroethylaniline, N-cyanoethyl-N-acetoxyethylaniline, N,N-di-β-hydroxyethylaniline, N,N-di-β-acetoxyethylaniline, N-ethyl-N,2-hydroxy-3-chloropropylaniline, N,N-di-β-cyanoethylaniline, N,N-di-β-cyanoethyl-3-methylaniline, N,β'-cyanoethyl-N-β''-hydroxyethyl-3-chloroaniline, N,N-di-β-cyanoethyl-3-methoxyaniline, N,N-dimethyl-3-acetylaminoaniline, N-ethyl-N-β-cyanoethyl-3-acetylaminoaniline, N,N-di-β-cyanoethyl-2-methoxy-5-acetylaminoaniline, N-methyl-N-phenacylaniline, N-β-cyanoethyl-2-chloroaniline, N,N-diethyl-3-trifluoromethylaniline, N-ethyl-N-phenylaniline, diphenylamine, N-methyldiphenylamine, N-methyl-4-ethoxydiphenylamine or N-phenylmorpholine, and also, for example, amines of the formula

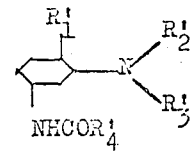

in which $R_1'$ represents a hydrogen atom or an alkyl or alkoxy group, $R_2'$ a cyanoalkoxyalkyl group, $R_3'$ a hydrogen atom or a cyanoalkoxyalkyl or acyloxyalkyl group, and $R_4'$ represents a hydrogen atom or an unsubstituted or substituted alkyl, cycloalkyl or alkoxy group or a benzene residue, and especially those of the formula

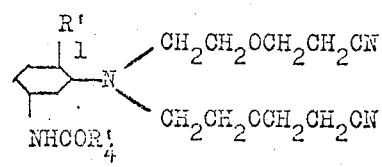

in which $R_1'$ and $R_4'$ have the above meanings.

Valuable results are also obtained with coupling components of the formula

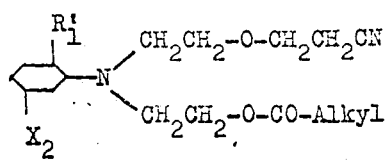

or

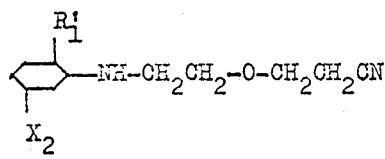

in which $R_1'$ has the above meaning and $X_2$ represents an acylamino group, and in which the alkyl group may be, for example, methyl, ethyl or propyl.

As relevant examples of coupling components the following compounds may be mentioned:

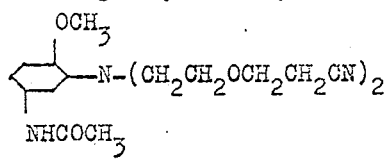 , 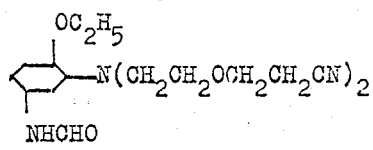

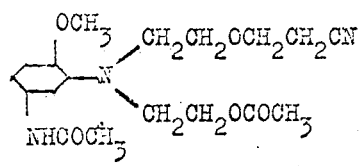 , 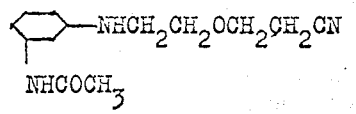

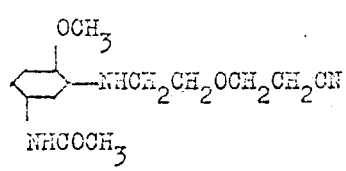 , 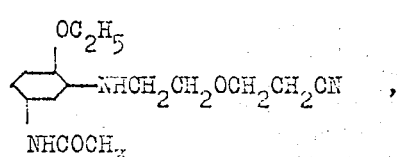

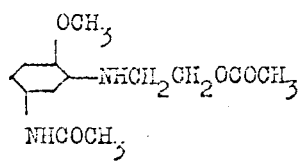 , 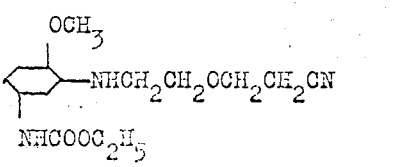

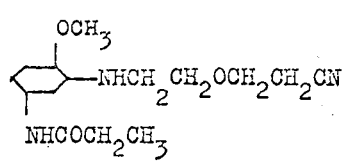

The coupling components of the naphthalene series which may be mentioned, apart from the naphthols are, for instance 1- or 2-naphthylamine and 2-phenylaminonaphthalene, 1-dimethylaminonaphthalene and 2-ethylaminonaphthalene.

As examples of heterocyclic coupling components the indoles may be mentioned for example 2-methylindole, 2,5-dimethylindole, 2,4-dimethyl-7-methoxyindole, 2-phenyl- or 2-methyl-5-ethoxyindole, 2-methyl-5- or -6-chloroindole, 1,2-dimethylindole, 1-methyl-2-phenylindole, 2-methyl-5-nitroindole, 2-methyl-5-cyanoindole, 2-methyl-7-chloroindole, 2-methyl-5-fluoro- or -5-bromoindole, 2-methyl-5,7-dichloroindole or 2-phenylindole, 1-cyanoethyl-2,6-dimethylindole; also pyrazoles e.g. 1-phenyl-5-aminopyrazole or 3-methyl-pyrazolone-5 or 1-phenyl-3-methyl-pyrazolone-5, 1,3-dimethyl-pyrazolone-5, 1-butyl-3-methyl-pyrazolone-5, 1-hydroxyethyl-3-methylpyrazolone-5, 1-cyanoethyl-3-methyl-pyrazolone-5, 1-(orthochlorophenyl)-3-methyl-pyrazolone-5, 3-carbomethoxy-pyrazolone-5; quinolines for example 1-methyl-4-hydroxy-quinolone-2, N-ethyl-3-hydroxy-7-methyl-1,2,3,4,-tetrahydroquinoline, or pyrimidines for example barbituric acid and 1,3-indandione, 1,8-naphthindandione or dimedone.

Instead of a single diazo component a mixture of two or more of the diazo components may be used according to this invention and instead of a single coupling component a mixture of two or more of the coupling components may be used according to this invention.

The said diazo components may be diazotized by known methods, e.g. with a mineral acid, especially hydrochloric acid, and sodium nitrite or, for example, with a solution of nitrosylsulphuric acid in concentrated sulphuric acid.

Coupling may also be carried out in known manner e.g. in a neutral, basis or acidic medium if desired in the presence of sodium acetate or similar buffer substances that affect the rate of coupling, or of catalysts e.g. pyridine or a salt thereof.

Any of the new dyestuffs that contains a quaternated etherified hydroxylamino group can be prepared according to process (c) of the present invention by quaternating the corresponding dyestuffs that contain an etherified hydroxylamino group which may be alkylated at the nitrogen atom my treatment with an alkylating agent. As such alkylating or quaternating agents there may be used e.g. esters of strong mineral acids or organic sulphonic acids, for instance dimethyl sulphate, diethyl sulphate, alkylhalides e.g. methyl chloride, bromide or iodide, aralkyl halides e.g. benzyl chloride, or esters of lower alkane sulphonic acids e.g. methyl esters of methane sulphonic, ethane sulphonic or butane sulphonic acid, or esters of benzene sulphonic acids which may contain additional substituents e.g. methyl, ethyl, propyl or butyl esters of benzene sulphonic acid, 2- or 4-methylbenzene sulphonic acid, 4-chlorobenzene sulphonic acid or 3- or 4-nitrobenzene sulphonic acid.

The alkylation is advantageously carried out by heating in an inert organic solvent e.g. a hycrocarbon for example benzene, toluene or xylene, or a halogenated hydrocarbon for example carbon tetrachloride, tetrachloroethane, chlorobenzene, orthodichlorobenzene, or a nitrohydrocarbon for example nitromethane, nitrobenzene or a nitronaphthalene. Solvents also suitable for the alkylation are acid anhydrides, acid amides and nitriles for example acetic anhydride, dimethyl-formamide or acetonitrile or dimethylsulphoxide. Instead of a solvent a substantial excess of aklylating agent may be used, but in such a case it must be ensured that the reaction mixture does not overheat because the reaction is strongly exothermic. Nevertheless it is in most cases necessary, especially in the presence of an organic solvent, to supply external heat to the reaction mixture to trigger off the reaction. In special cases the alkylation may also be carried out in an aqueous medium or in an alcohol, if desired, in the presence of a small quantity of potassium iodide.

The dyestuff salts may be purified if necessary, by dissolving advantageously in water, whereupon any unreacted starting dyestuff can be filtered off in the form of an insoluble sediment. On addition of a water-soluble salt, for example sodium chloride, to the solution the dyestuff can again be isolated.

The anion present in the quaternated dyestuff obtained by the present invention is preferably the residue of a strong acid, for example of sulphuric acid or a semi-ester thereof, or an arylsulphonic acid, or it may be a halogen ion. The said anions, which according to this invention are introduced into the dyestuff molecule, may be replaced, if desired, by anions of other inorganic acids, for example of phosphoric or sulphuric acid, or organic acids e.g. formic, lactic or tartaric acid; if desired, the free bases may be used in certain cases. The dyestuff salts may also be used in the form of double salts, for example with the halides of the elements of group II of the Periodic Table, especially with zinc chloride or cadmium chloride.

The new dyestuffs or dyestuff salts containing a quaternated amino group are suitable for dyeing or printing a wide variety of fully synthetic fibers, for example of polyvinylchloride, polyamide or polyurethane fibres, also fibres of polyesters of aromatic dicarboxylic acids e.g. polyethylene terephthalate fibres but particularly polyacrylonitrile fibres or polyvinylidene-cyanide fibres (Darvan). The term polyacrylonitrile fibres refers in the first place to polymers containing more than 80% e.g. 80 to 95%, of acrylonitrile; in addition, they contain 5 20% of vinyl acetate, vinyl pyridine, vinyl chloride, vinylidene chloride, acrylic acid, acrylic acid esters, methacrylic acid, methacrylic acid esters or the like. These products are marketed, for example, under the following trademarks: "Acrilan 1656" (The Chemstrand Corp., Decatur, Alabama,), "Acrilan 41" (The Chemstrand Corp.), "Creslan" (American Cyanamide Company), "Orlon 44" (Du Pont), "Crylor HH" (Soc. Rhodiaceta SA. France), "Leacril N" (Applicazioni Chimice Societa per Azioni, Italy), "Dynel" (Union Carbide Chem. Corp.), "Exlan" (Janpan, Exlan Industry Co., Japan), "Vonnel" (Mitsubischi, Japan), "Verel" (Tennessee Eastman, U.S.A.), "Zefran" (Dow Chemical, U.S.A.), "Wolcrylon" (Filmfabrik Agfa, Wolfen, East Germany), "Ssaniw" (U.S.S.R.), and also "Orlon 42," "Dralon," "Courtelle" and the like.

On these fibres, or on mixtures of two or more of these fibres, the new dyestuffs produce strong, level shades having good light fastness and general fastness properties, especially good fastness to washing, perspiration, sublimation, creasing, decatizing, ironing, abrasion, carbonizing, water, seawater, dry cleaning, cross dyeing and solvents. The new dyestuffs of this invention display inter alia good stability over a wide pH range, good affinity e.g. in aqueous solutions of different pH values, and good fastness to fulling. Moreover, the new dyestuffs have in general good reservation for wool and other natural polyamide fibres.

The quaternated, water-soluble dyestuffs are in general practically insensitive to electrolytes and some of them are very readily soluble in water or in polar solvents. Dyeing with the quaternated water-soluble dyestuffs is in general carried out in an aqueous, neutral or acidic bath, at the boil under atmospheric, or under superatmospheric pressure at an elevated temperature. The commerical levelling agents do not affect the dyeing operation, but they are not needed.

The new dyestuffs are also particularly suitable for three colour dyeing. Furthermore, by virtue of their stability towards hydrolysis they may be used with advantage for high temperature dyeing and for dyeing in the presence of wool. They may also be used for printing, using, for example, a printing paste that contains the dyestuff and the assistants conventionally used in dyeing. Furthermore, they may be used for dyeing acrylonitrile polymers in bulk and also other plastic masses which may be dissolved, to produce shades that are fast to light and washing, and also for colouring oil paints and lacquers, or for dyeing cotton, especially mordanted cotton, cellulose, regenerated cellulose and paper.

The new water-insoluble dyestuffs prepared according to this invention, which contain a tertiary etherified hydroxylamino group, are advantageously applied in a finely disperse form in the presence of dispersants for example soap, cellulose waste sulphite liquor or synthetic detergents, or of a combination of different wetting and dispersing agents. As a rule it is advantageous to convert these dyestuffs before the dyeing operation into a dye preparation that contains a dispersant and the finely disperse dyestuff in such a form that when the dye preparation is diluted with water a fine dispersion is obtained. Such dye preparations may be manufactured in known manner e.g. by reprecipitating the dyestuff from sulphuric acid and grinding the resulting suspension with sulphite waste liquor, or alternatively by grinding the dyestuff in a highly efficient mill in the dry or wet form, with or without addition of a dispersant during grinding. They are also suitable for dyeing or printing a wide variety of semi-synthetic or fully synthetic fibres e.g. cellulose acetate fibres, polyolefine fibres for example modified polypropylene, polyacrylonitrile, polyvinylchloride, polyamide or polyurethane fibres, and above all fibres of polyesters of aromatic dicarboxylic acids, e.g. polyethylene terephthalate fibres.

When strong dyeings, e.g. on polyethylene terephthalate fibres, are desired, it is advantageous to add to the dyebath a swelling agent, or to dye under superatmospheric pressure at a temperature above 100°C, for example at 120°C. Suitable swelling agents are aromatic carboxylic acids, for example benzoic or salicylic acid, phenols, for example ortho- or parahydroxydiphenyl, aromatic halogen compounds, for example chlorobenzene, ortho-dichlorobenzene or trichlorobenzene, phenylmethylcarbinol or diphenyl. When dyeing under superatmospheric pressure it is advantageous to render the dyebath slightly acidic by adding e.g. a weak acid for example acetic acid.

The new dyestuffs containing a tertiary etherified hydroxylamino group are specially suitable for dyeing by the so-called thermofixation method in which the fabric to be dyed is impregnated with an aqueous disperison of the dyestuff which contains advantageously 1 to 50% of urea and a thickener, especially sodium alginate, preferably at a temperature not exceeding 60°C, and the fabric is then squeezed in the usual manner, advantageously so that it retains 50 to 100% of liquid referred to its initial weight.

For fixing the dyestuff on the impregnated fabric it is heated, advantageously after first having been dried e.g. in a warm current of air, to a temperature above 100°C, e.g. between 180° and 220°C.

The above-mentioned thermofixation method is particularly suitable for dyeing mixed weaves of polyester fibres and cellulose fibres, especially cotton. In this case the padding liquor contains in addition to the dyestuff of this invention also dyestuffs suitable for dyeing cotton, for example substantive dyestuffs or vat dyes, or more especially the so-called reactive dyestuffs, that is to say dyestuffs capable of fixation by forming a chemical bond with cellulose, for instance dyestuffs containig a chlorotriazine or chlorodiazine ring. In the latter case it is advantageous to add to the padding liquor and acid acceptor, for example, a carbonate, phosphate, borate or perborate of a alkali metal or a mixture thereof. When dyeing with vat dyes, it is necessary to treat the padded fabric, after it has been heated, with an aqueous alkaline solution of one of the reducing agents generally used in vat dyeing.

The dyeings produced by the present processes on polyester fibres are advantageously subjected to an aftertreatment e.g. by heating in an aqueous solution of a non-ionic detergent.

The dyestuffs of this invention are also suitable for dyeing mixed weaves of polyester fibres and wool; the wool portion remains reserved and can subsequently be dyed with a wool dyestuff.

The present dyestuffs are suitable not only for application by impregnation but also for printing, using e.g. a printing paste that contains the finely disperse dyestuff and the usual printing assitants, for example wetting and thickening agents, if required in admixture with one of the cotton dyestuffs mentioned above and if desired in the presence of urea and/or of an acid acceptor.

The present processes produces stong dyeings and prints having excellent fastness properties, especially good fastness to light, sublimation, decatizing, washing and chlorinated water. They have the further advantages that the dyestuffs to be used according to this invention reserve well on wool and cotton.

Unless otherwise indicated, parts and percentages in the following examples are by weight.

EXAMBLE 1

13.8 Parts of 4-nitroaniline are diazotized in the usual manner and the resulting diazo solution added to a mixture of 250 parts of an aqueous solution containing 39.5 parts of N,N-dimethyl-N-methoxy-N,2-(N'-phenyl-N'-ethyl)-aminoethyl ammonium toluenesulphonate and 500 parts of ice. The coupling mixture is rendered neutral to Congo red with sodium acetate and stirred for 2 hours at 0° – 5°C to complete the dyestuff formation. After heating to room temperature, the resulting dyestuff of the formula

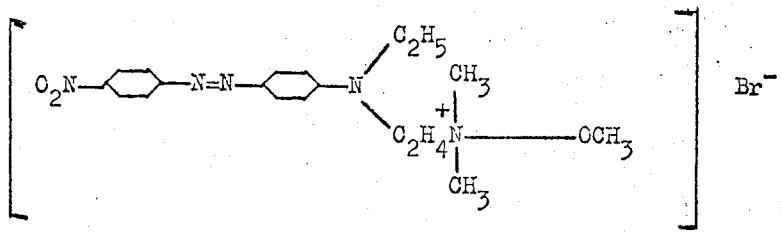

is precipitated with sodium bromide, suctioned-filtered and dried. It dyes polyacrylonitrile fibres fast scarlet shades.

When instead of 4-nitroaniline one of the diazo components shown in Column II of the following Table is used, the shades listed in Column III are obtained:

| No. | II | III |
| --- | --- | --- |
| 1 | 2-chloro-4-nitroaniline | red |
| 2 | 2,6-dichloro-4-nitroaniline | yellow brown |
| 3 | 2-amino-5-nitrobenzonitrile | ruby |
| 4 | 4-amino-3-chlorophenylmethylsulphone | orange |
| 5 | 2-amino-5-nitrothiazole | blue |
| 6 | 2-amino-4-phenyl-1,3,5,-thiadiazole | red |
| 7 | 2-bromo-4,6-dinitraniline | violet |
| 8 | 4-amino-3,5-dichlorobenzene-sulphonic acid diethylamide | yellow |
| 9 | 2-amino-6-nitrobenzthiazole | violet |
| 10 | 2-cyano-4-nitro-6-bromoaniline | violet |
| 11 | 2-amino-5-phenyl-1,3,4-thiadiazole | scarlet |
| 12 | 4-aminoazobenzene | orange |

EXAMPLE 2

A homogeneous mixture is prepared from 17.2 parts of 2-chloro-4-nitroaniline, 15 parts of concentrated hydrochloric acid and 100 parts of ice; 15 parts of concentrated hydrochloric acid and 100 parts of ice are then added followed by 25 parts of a 4N aqueous solution of sodium nitrite. The whole is stirred for 2 hours, the diazo solution is clarified by filtration and poured into a mixture of 21 parts of N-methyl-N,2-(N'-phenyl- N'-ethyl)-aminoethyl-methoxyamine, 50 parts of glacial acetic acid and 300 parts of ice. The coupling mixture is rendered neutral to Congo red by dropping in within one hour a concentrated aqueous solution of sodium acetate, and the dyestuff is suctioned-filtered, washed with water and dried.

The resulting dyestuff of the formula

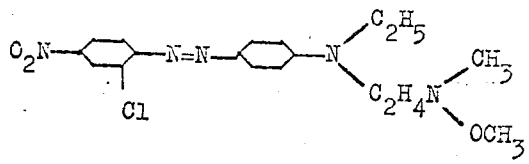

dyes polyethylene terephthalate and cellulose acetate fibres fast red shades.

The N-methyl-N,2-(N'-phenyl-N'-ethyl)-aminoethyl-methoxyamine used as coupling component may be prepared in the following manner: A mixture of 159 parts of N-ethyl-N,2-hydroxyethylaniline toluenesulphonic acid ester and 270 parts of an alcoholic solution containing 61 parts of N-methyl-N-methoxyamine is stirred for 1½ hours at 70° – 80°C, 50 parts of sodium bicarbonate are added, the excess N-methyl-N-methoxyamine together with 100 parts of alcohol is distilled off, the residue filtered, the alcoholic filtrate diluted with water and extracted with ether. The whole is then evaporated and the residue distilled at 72°C under a vacuum of 0.03 mm Hg.

EXAMPLE 3

The procedure was the same as in Example 2, except that the diazo component was 13.8 parts of 4-nitroaniline instead of 2-chloro-4-nitraniline.

After coupling the dyestuff of the formula

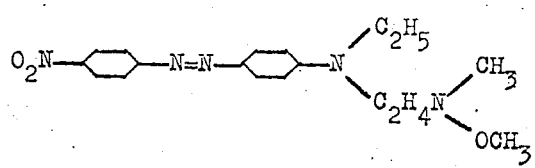

is obtained which dyes polyester and cellulose acetate fibres brilliant scarlet shades.

EXAMPLE 4

A solution of 8 parts of the dyestuff described in Example 2 in 100 parts of chlorobenzene is mixed with 5 parts of dimethyl sulphate and stirred for 3 hours at 120°C, allowed to cool, filtered and the quaternated dyestuff is washed with benzene and petroleum ether. In water it gives a clear red solution; it dyes polyacrylonitrile fibres red tints of very good fastness to light.

EXAMPLE 5

A mixture of 7.1 parts of the dyestuff obtained as described in Example 3, 4 parts of para-toluenesulphonic acid methyl ester and 100 parts of anhydrous chlorobenzene is stirred for 6 hours at 120°C. After working up as described in Example 4 a dyestuff in which the cation is identical with that of Example 1 is obtained.

EXAMPLE 6

A solution of 47.5 parts of N-cyanoethyl-N-hydroxyethylaniline in 80 parts of anhydrous pyridine is treated portionwise at 10° – 15°C with 52.5 parts of p-toluene sulphonylchloride and further stirred for 3 hours at 10° – 15°C. The reaction mixture is poured into 260 parts of ice and water and stirred for a few hours. The precipitated ester is filtered and dried under vacuum; its melting point is 76° – 77°C.

A mixture of 34.4 parts of the resulting N-cyanoethyl-N-para-toluenesulphonyloxy-ethylaniline and 15.1 parts of N,N-dimethyl-N-benzyloxyamine is stirred for 7 hours at about 95°C. The reaction product obtained in this manner is used as it is for the further reaction.

39 Parts by volume of concentrated hydrochloric acid and 17.25 parts of 2-chloro-4-nitroaniline are intimately mixed in a mortar dish and then stirred into 400 parts of ice and water. 25 Parts by volume of 4N sodium nitrite solution are dropped in at 0° to 5°C and the whole stirred until a clear diazo solution forms which is then added to a solution containing the coupling component obtained as described above (49.5 parts) in 70 parts of alcohol. The coupling mixture is rendered neutral to Congo red with sodium acetate solution. On completion of the coupling reaction the dyestuff is precipitated with sodium chloride, suctioned-filtered, dissolved in hot water and the solution filtered clear. The dyestuff of the formula

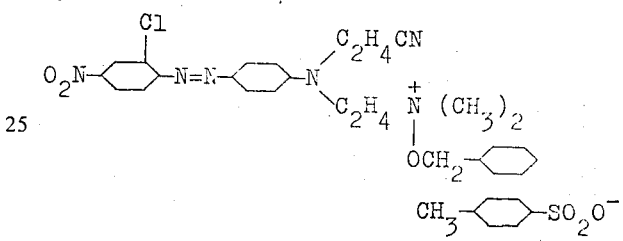

is salted out, filtered and dried. It dyes polyacrylonitrile fibres stong scarlet shades having very good fastness properties.

EXAMPLE 7

A mixture of 13.8 parts of 4-nitroaniline, 30 parts by volume of water and 30 parts by volume of concentrated hydrochloric acid is heated at 60° – 70°C until a clear solution is formed. The 100 parts of ice are added and at 0°C 7 parts of sodium nitrite are aded all at once. After stirring for 10 minutes the diazotization is complete. The diazo solution is poured into a solution of 29 parts of the methanesulphonic acid ester of 3-(N-methyl-N,2'-hydroxyethyl)-aminoacetanilide in 300 parts of glacial acetic acid. At 0° – 5°C within 30 minutes the whole is rendered neutral to Congo red with 70 parts of a 4N sodium acetate solution and the coupling mixture diluted with 600 parts of ice water. The dyestuff thus formed is suctioned-filtered, washed free from acetic acid with water and dried at a low temperature under vacuum. A mixture of 22 parts of this dyestuff, 200 parts of ethanol and 7.5 parts of isoxalidine is refluxed for 7 hours, the reaction mixture then poured into 1,000 parts of water and 5 parts of 30% aqueous sodium hydroxide solution are added. The completely precipitated dyestuff of the formula

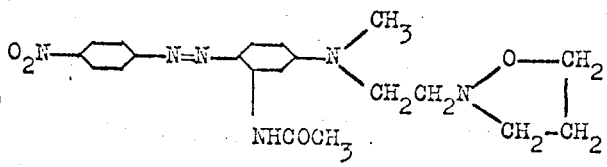

is suctioned-filtered and dried. It dyes cellulose acetate fibres clear red tints.

EXAMPLE 8

A solution of 29 parts of 4-amino-α-(N-chloro-N,N-dimethyl-N-butoxyamino)-acetophenone is a mixture of 25 parts of 36% hydrochloric acid and 250 parts of ice water is rapidly mixed at 0° – 5°C with a solution of 7 parts of sodium nitrite in 20 parts of water. On completion of the diazotization a small excess of nitrous acid is decomposed by adding 0.2 part of sulphamic acid, and the mixture is then run into a mixture of 13 parts of 2-methylindole, 150 parts of glacial acetic acid, 50 parts of ice and 15 parts of crystalline sodium acetate. After stirring for 2 hours the batch is diluted with 600 parts of water and the dyestuff salted out with 30 parts of sodium chloride, filtered and dried. An orange dyestuff powder is obtained which dyes polyacrylonitrile fibres from an aqueous bath fast yellow tints.

The diazo component is manufactured by condensing 4-acetylamino-α-chloroacetophenone with N,N-dibutoxyamine, followed by hydrolysis of the acetyl group by boiling for 2 hours in 2N hydrochloric acid.

When 2-methylindole is replaced by the coupling components listed in Column II of the following Table, further dyestuffs are obtained which dye polyacrylonitrile fibres the shades shown in Column III.

| No. | Coupling Component (II) | Shade on polyacrylonitrile (III) |
|---|---|---|
| 1 | 3-methylpyrazolone-(5) | yellow |
| 2 | 1-phenyl-3-methylpyrazolone-(5) | do. |
| 3 | Indan-1,3-dione | do. |
| 4 | N-methyl-N,2-cyanoethylaniline | orange |
| 5 | diphenylamine | do. |
| 6 | 2-naphthylamine | scarlet |
| 7 | N-ethyl-2-naphthylamine | red |
| 8 | 2-naphthol | scarlet |
| 9 | 2-(N,N-bis-cyanoethoxy-ethylamino)-4-propionylamino anisole | ruby |

EXAMPLE 9

A mixture of 105 parts of N-methyl-N,2-hydroxyethylmethoxyamine (obtained according to Jones and Major, J. Am. Chem. Soc. 52, 1085 [1930]) in 1,000 parts of anhydrous pyridine is mixed with 190 parts of 4-nitrobenzoylchloride while cooling and the whole is stirred for 5 hours at 5° – 10°C. the reaction mixture is diluted with 5,000 parts of ice water and the precipitated ester suctioned-filtered, dissolved in 3,000 parts of ethanol and hydrogenated in the presence of a catalytic amount of Raney nickel under atmospheric pressure at room temperature until no more hydrogen is consumed. Evaporation of the alcoholic solution furnishes 4-aminobenzoic acid-2'-(N-methyl-N-methoxyamino)-ethyl ester. 2.24 Parts of this ester are dissolved at 0°C in 25 parts by volume of N hydrochloric acid and a solution of 0.7 part of sodium nitrite in 3 parts by volume of water is added. The resulting diazo solution is added to a solution of 1.3 parts of 3-amino-4-methoxy-toluene in 15 parts by volume of N hydrochloric acid and 20 parts by volume of 4N sodium acetate solution are dropped in at 0° –5°C. The whole is stirred for 3 hours and the precipitated dyestuff suctioned-filtered, washed with water and again dissolved in 50 parts of N hydrochloric acid, diazotized at 10°C with 10 parts by volume of N sodium nitrite solution and after 2 hours the diazo solution is poured into a solution of 1 part of para cresol in 100 parts of water, 2 parts by volume of concentrated sodium hydroxide solution and 10 parts of sodium carbonate. On completion of the coupling reaction the dyestuff is suctioned-filtered, washed with water and dried. It dyes polyethylene terephthalate fibres fast orange tints.

EXAMPLE 10

A mixture of 7.8 parts of 1-methylamino-4-(4'-methyl3'-chloromethyl)-phenylaminoanthraquinone and 100 parts of a 4% ethanolic solution of N-ethyl-N-ethoxyamine is refluxed for 24 hours. The resulting dyestuff of the formula

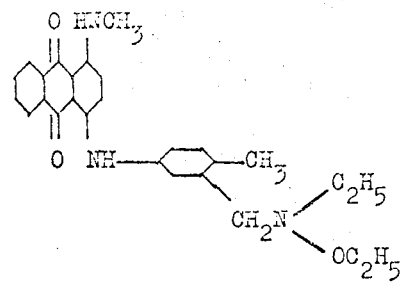

dyes polyester fibres brilliant blue shades.

EXAMPLE 11

A mixture of 4.5 parts of the dyestuff of Example 10, 100 parts of chlorobenzene and 2 parts of dimethyl sulphate is stirred and heated for 8 hours at 90° – 100°C. The quaternated dyestuff salt which crystallizes out on cooling dyes polyacrylonitrile fast blue tints. Similar blue dyestuffs are obtained when dimethyl sulphate is replaced by diethyl sulphate or para-toluenesulphonic acid butyl ester.

EXAMPLE 12

4 Parts of the dyestuff of the formula

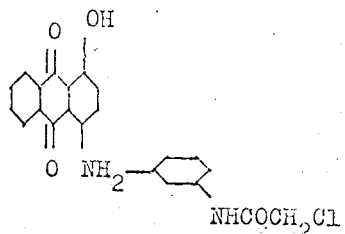

are dissolved in 50 parts of dimethylformamide and 2 parts of N,N-dimethylbutoxyamine are added. The mixture is stirred at 80°C until a specimen has become completely water-soluble. The batch is then diluted with 400 parts of water and from the aqueous solution the dyestuff is precipitated with 40 parts of sodium chloride. On polyacrylonitrile it produces fast violet dyeings.

EXAMPLE 13

A mixture of 25 parts of 5-amino-1,9-isothiazole anthrone, 16 parts of 3-N-methyl-N-methoxyaminopropionylchloride and 500 parts of chlorobenzene is stirred for 2 hours at 120°C and the chlorobenzene is distilled off with steam, to yield the dyestuff of the formula

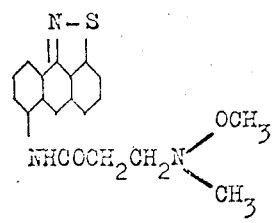

which dyes polyester fibres fast yellow shades.

EXAMPLE 14

17 Parts of 1-hydroxy-4-p-toluidinoanthraquinone are added at 10° – 15°C to 50 parts of chlorosulphonic acid and the whole is stirred at this temperature for 4 hours. The blue solution is poured over ice and the blue precipitate formed suctioned-filtered, washed with water until the washings run neutral and dried under vacuum. This product is then added portionwise to a solution of 10 parts of N,2-hydroxyethyltetrahydro-1,2-oxazine in 100 parts of pyridine and the whole is stirred for 10 hours at 20° – 30°C. The reaction mixture is diluted with 500 parts of water and the precipitated dyestuff of the formula

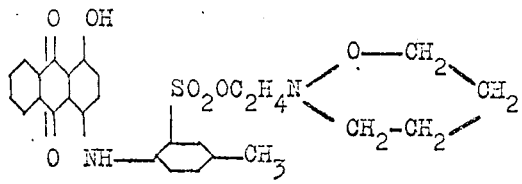

is suctioned-filtered, washed free from pyridine with water and dried. It dyes polyester fibres from an aqueous dispersion fast violet shades.

EXAMPLE 15

A mixture of 25.5 parts of N,N-dimethyl-N,2-(N'-ethyl-N',p-aminophenyl)-aminoethyl benzoyloxy ammonium toluenesulphonate [obtainable by nitrosation of the coupling component described in Example 6 and reduction with zinc dust], 10 parts of 2,4-dinitrochlorobenzene and 200 parts of ethanol is refluxed for 5 hours. On cooling, the dyestuff crystallizes out and is suctioned-filtered and dried. It dyes polyacrylonitrile fibres fast yellowish brown shades.

A dyestuff having similar properties is obtained when 15 parts of 4-chloro-3-nitrobenzenesulphonylanilide are used instead of 2,4-dinitrochlorobenzene.

EXAMPLE 16

25 Parts of phosphorus oxychloride are dropped into 17.5 parts of dimethylformamide while cooling. The 22.2 parts of N-methy-N,2-(N'-ethyl-N',3'-toluyl)-aminoethylmethoxyamine are slowly added to the resulting mixture at a rate such that the temperature does not exceed 60°C and the whole is then further stirred for 6 hours at 60°C, poured into 500 parts of ice water and adjusted to a pH value of 9 with concentrated sodium hydroxide solution. The emulsion is extracted with chloroform and the aldehyde is isolated by evaporating the chloroform solution.

A mixture of 25 parts of the aldehyde, 7.3 parts of malodinitrile, 100 parts of methanol and 1 part of piperidine is refluxed for 4 hours, and then 60 parts of methanol are distilled off. On cooling, the dyestuff of the formula

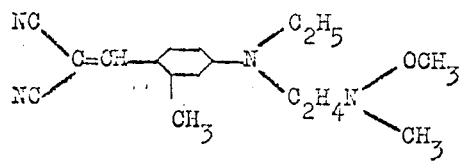

crystallizes out. It dyes polyester and cellulose acetate fibres fast, greenish yellow shades.

EXAMPLE 17

17 Parts of the dyestuff described in Example 16 are dissolved at 80°C in 50 parts by volume of dimethylformamide and 13 parts of dimethyl sulphate are slowly added at this temperature. After stirring for 2 hours at 80°C a specimen forms a clear aqueous solution. On addition of 150 parts of ethyl acetate the dyestuff salt is obtained in cyrstalline form. On polyacrylonitrile fibres it produces greenish yellow dyeings having excellent fastness to light.

We claim:
1. A dyestuff of the formula

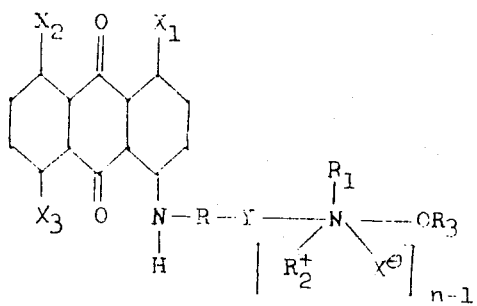

in which
n is 1 or 2,
$X_1$ is $NH_2$ or OH,
$X_2$ and $X_3$ each independently is hydrogen, $NH_2$, OH or $NO_2$,
R is methylene, ethylene, phenylene, toluylene
Y is alkylene of at most 4 carbon atoms,
$R_1$ is hydrogen or alkyl of at most 3 carbon atoms,
$R_2$ is hydrogen, alkyl of at most 3 carbon atoms or benzyl,
$R_3$ is alkyl of at most 3 carbon atoms, benzyl or cyclohexyl, and
$X^-$ is an anion.

2. A dyestuff according to claim 1 in which $X^-$ is a halide.

3. A dyestuff according to claim 1 in which X is chlorine, bromine, iodine, $=SO_4$, $-SO_3-$alkyl, $-SO_3$aryl or $-SO_3-O-$alkyl.

4. A dyestuff according to claim 1 of formula

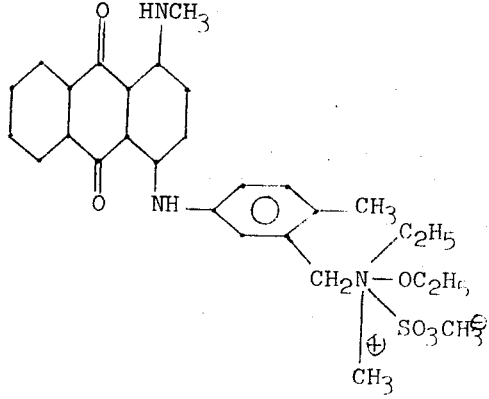

* * * * *